United States Patent Office 3,355,782
Patented Dec. 5, 1967

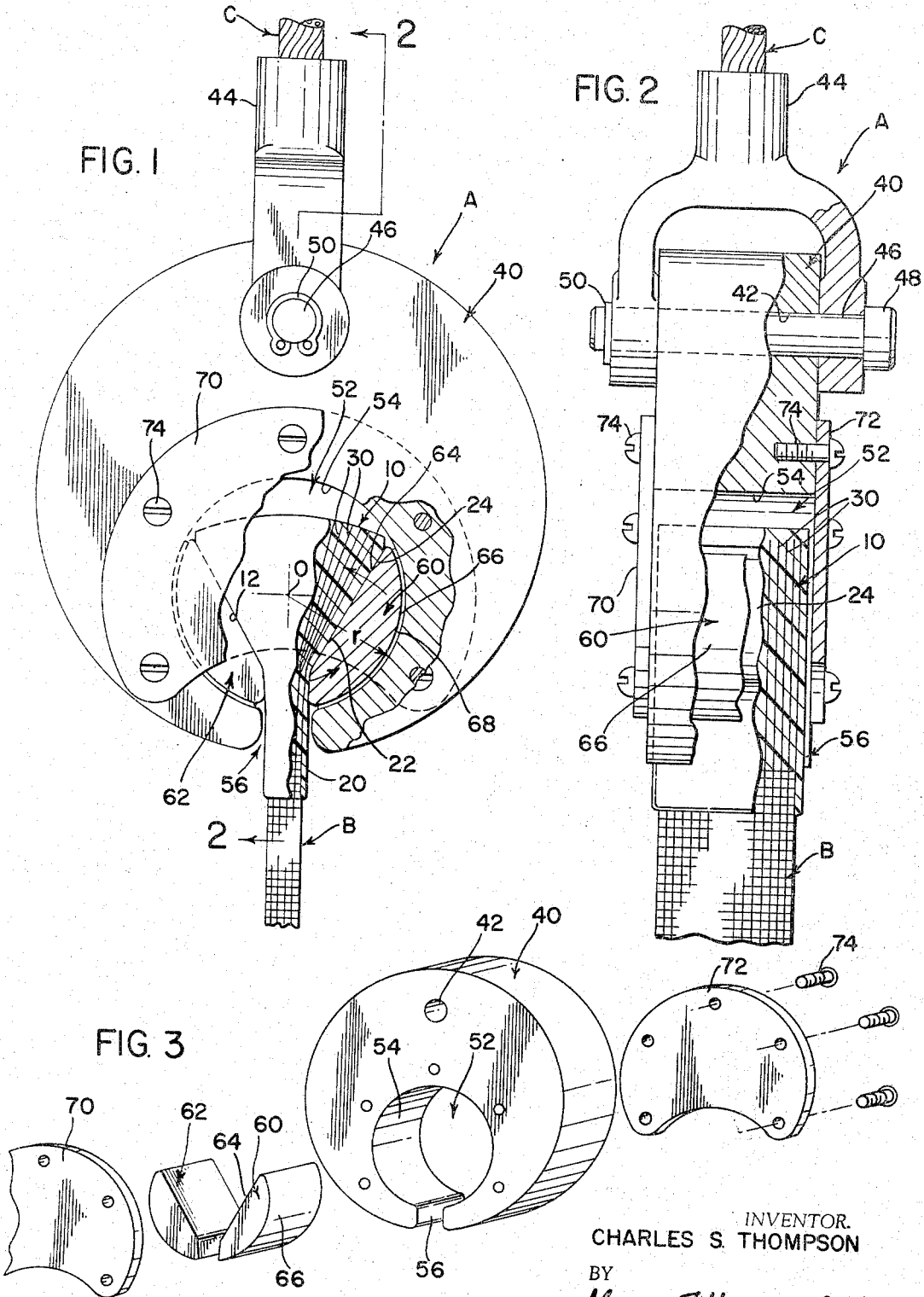

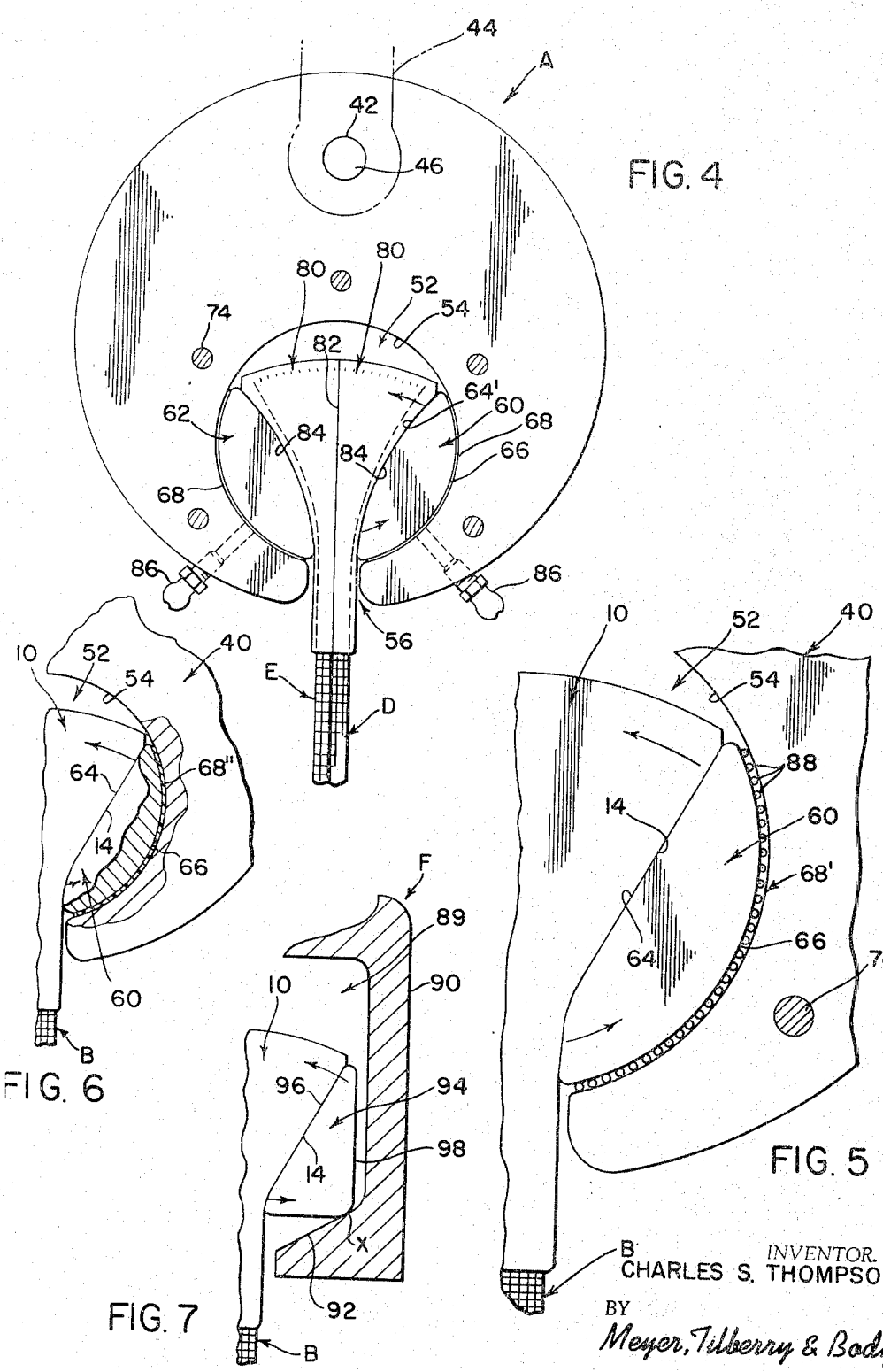

3,355,782
COUPLING FOR A FLAT WOVEN
BAND OR TAPE
Charles S. Thompson, Vincentown, N.J., assignor to
E. W. Bliss Company, Canton, Ohio, a corporation of
Delaware
Filed Aug. 18, 1966, Ser. No. 573,276
15 Claims. (Cl. 24—265)

This invention pertains to the art of couplings, and more particularly to a coupling for a flat woven band.

The present invention is particularly applicable to a coupling which receives a plastic lug formed on the end of a woven band or tape of the general type used in aircraft arresting gear, and it will be described with particular reference thereto; however, it should be appreciated that the invention has much broader applications and may be used to receive a plastic lug on the end of various other woven bands or tapes.

The phrase "woven band" or "woven tape" as used herein, refers to a generally flat tension or load carrying element which is formed by weaving together both transverse and longitudinal synthetic strands. Each strand is generally formed from a number of separate plastic filaments, such as nylon filaments.

It has become common practice in aircraft arresting apparatus to provide a cable or pendant stretched across a runway for engagement by a landing aircraft, an energy absorber adjacent the runway, and a flat woven tape which connects the cable or pendant onto the energy absorber. Mechanical couplings are used between the woven tape and the cable or pendant and between the tape and the energy absorber. The present invention is directed primarily to a coupling for use between the pendant and the woven tape; however, as mentioned above, the invention has broader applications.

When an aircraft engages the pendant, a tremendous force is exerted by the pendant onto the tape. This force must be transmitted through the mechanical coupling; therefore, the coupling between the tape and pendant must be sufficiently strong to endure high forces without failure. In addition, the best arresting operation is obtained when the afore-mentioned mechanical couplings have a relatively low weight and are not damaged as they are pulled down the runway.

Various couplings have been designed for attaching the woven tape onto the aircraft engaging pendant. For instance, the tape has been inserted into a wedging mechanism which increases the clamping force on the tape as the tension on the tape increases. Of course, such an arrangement places high stresses on certain portions of the tape end. In accordance with another plan, the tape has been looped around a coupling and locked in position by mechanical means, such as bolts. These couplings had to be exceedingly large to bear the necessary forces being transmitted from the pendant to the tape. Recently, a completely new concept has been developed to couple the woven tape onto the pendant. This concept involves unweaving the strands from the end of the tape and molding a plastic lug having diverging surfaces onto the end of the tape. This provides the tape with an enlarged terminal end or head. A coupling having an internal cavity with surfaces generally matching the surfaces of the plastic lug is adapted to receive the lug. Since the lug is, in essence, an enlarged head, it cannot be pulled easily from the cavity. The coupling also includes a means for securing the pendant thereto. In this manner, a superior coupling is provided between the pendant and the woven tape. Since the plastic lug is somewhat resilient, forces between the coupling and tape are distributed over the diverging surfaces of the lug. This type of coupling mechanism often provides a holding force approaching the tensile strength of the woven tape. Because of the simplicity and high strength of the plastic lug type tape coupling, it is becoming widely used for arresting gear, parachutes and other applications wherein a woven tensile member is affixed to a support member, such as a cable or frame.

The present invention is directed toward an improvement in the plastic lug type of coupling for securing a flat woven tape onto a support member, such as a cable.

In accordance with the present invention, the lug receiving cavity of the coupling is provided with a contour larger than the contour of the plastic lug, and this cavity is provided with at least one floating insert which defines a nest for the lug. The floating insert has a first surface generally matching one of the bearing faces of the plastic lug and a second surface, and the cavity has a cam surface. The cam surface of the cavity coacts with the second surface of the insert to force the first surface of the insert against the outermost, or enlarged, end of the plastic lug when tension is applied to the tape. In other words, the floating insert shifts when tension is applied to the woven tape, and this shift of the insert distributes forces from the inner, or smaller, end of the plastic lug to the outer, larger end of the lug. The larger end of the lug has an increased bulk so that it is more capable of withstanding the compressive forces exerted by the floating insert. By using this floating insert to distribute, or change, the loading on the plastic lug, a higher load carrying capacity for a given coupling weight is obtainable.

The primary object of the present invention is the provision of a coupling for a flat woven tape having a lug with diverging bearing faces on the end thereof, which coupling increases the load carrying capacity of the coupling per unit weight of the coupling.

Another object of the present invention is the provision of a coupling for a flat woven tape having a lug with diverging bearing faces on the end thereof, which coupling redistributes the load or forces on the bearing faces of the lug when a tension force is applied to the tape.

Still another object of the present invention is the provision of a coupling for a flat woven tape having a lug with diverging bearing faces on the end thereof, which coupling includes at least one floating insert for increasing the compressive load on the outer, enlarged portion of the lug when a tension force is applied to the band.

These and other objects and advantages will become apparent from the following description used to illustrate the preferred embodiments of the invention as read in connection with the accompanying drawings in which:

FIGURE 1 is a partially cross-sectioned, front elevational view illustrating the preferred embodiment of the present invention;

FIGURE 2 is a cross-sectional view taken generally along line 2—2 of FIGURE 1;

FIGURE 3 is an exploded view illustrating the preferred embodiment of the present invention;

FIGURE 4 is a front plan view illustrating the use of the preferred embodiment as shown in FIGURES 1-3 with a double lug structure; and, FIGURES 5, 6, and 7 illustrate modifications of the preferred embodiment shown in FIGURES 1-4.

Referring now to the drawings wherein the showings are for the purpose of illustrating preferred embodiments of the invention only and not for the purpose of limiting same, FIGURES 1-3 show a coupling A for attaching a flat woven band or tape B onto a metal or nylon cable or pendant C. In practice, the tape B is attached to an energy absorber, and the cable C is stretched across a runway to engage and arrest a landing aircraft. The tape B is provided with a somewhat conventional plastic lug 10 extending transversely across the tape and having outwardly diverging, bearing faces 12, 14, which are illustrated in FIGURE 1 as flat surfaces. Lug 10 includes a generally straight neck 20, an inner, smaller end 22 and an outer, larger end 24. The woven tape is formed from a plurality of individual longitudinal strands 30 which are unwoven in the lug portion and homogeneously distributed throughout the complete plastic lug so that the lug forms a substantially integral, enlarged head on the end of the band. Each strand 30 is formed from a plurality of separate filaments which are also unravelled and distributed throughout the lug. Consequently, the lug 10 is a homogeneous plastic member securely adhered to each of these numerous, individual filaments. By forming the lug 10 from a plastic material which has a certain degree of flexibility and flowability, such as epoxy resin, the bearing surfaces 12, 14, can be distorted to distribute forces therealong without causing damaging stress concentration problems at any particular area, especially at the junction of neck 20 and small end 22.

Referring now to the coupling A, it includes a metal body 40 having an upper hole 42. This hole supports a bifurcated adapter 44 by means of a pin 46 having a head 48 and a snap ring 50. The metal or plastic cable C is attached onto the adapter 44, by any appropriate mechanism. It is appreciated that the cable C may be replaced by any other support element, such as a frame; however, since the coupling A is illustrated for use in an arresting gear, the aircraft engaging pendant C is shown in the illustrated embodiment of the invention. If the pendant or cable C is formed from nylon, the adapter 44 may be provided with a cavity, and a plastic lug, similar to lug 10, matching the cavity may be formed onto the end of the cable.

Spaced from hole 42, body 40 is provided with a lug receiving cavity 52 defined by cylindrical surface 54. This surface has a radius r and a center of curvature o, as shown in FIGURE 1. A slot 56 communicates the cavity 52 with the exterior of body 40. As clearly shown in FIGURES 1 and 2, the center of curvature o is an axis parallel with the transverse dimension of woven tape B, and, in a like manner, the slot 56 is parallel with this dimension. Two somewhat identical floating inserts 60, 62 provide a nest for lug 10 within cavity 52. Since the inserts are substantially identical, only insert 60 will be described in detail, and this description will apply equally to insert 62. Insert 60 includes a first surface 64 generally matching, and in contact with, face 14 of lug 10. A second surface 66 generally matching cylindrical surface 54, and contacting this surface, is provided at the opposite side of insert 60. In this manner, the inserts 60, 62 form a nest to receive the lug 10 on the end of woven tape B. The use of the two floating inserts 60, 62 substantially decreases the manufacturing costs of this coupling. It is a relatively simple manufacturing process to bore cavity 52 into body 40. The inserts 60, 62 then adapt this cavity to receive the lug 10. This provides a strong, somewhat inexpensive structure for the coupling. If the nest for the lug were to be formed into the body 40 without using the inserts 60, 62 a complicated manufacturing procedure would be required. For this reason, one aspect of the present invention is the manner in which the contoured nest is provided for lug 10 by first boring a cylindrical hole into the body 40. The outer contour of the body may take a variety of configurations; however, a circular configuration allows the body 40 to be made from available bar stock.

The inserts 60, 62 float within cavity 52. More specifically, they ride along the cylindrical surface 54 of cavity 52. An anti-friction means 68, which in this embodiment of the invention is a lubricant, allows the inserts 60, 62 to move more freely along the surface 54. The inserts and lug are maintained within the cavity 52 by face plates 70, 72 which are held in position on the body 40 with a plurality of spaced bolts 74.

The inserts 60, 62 generally pivot around the center of curvature, or axis, o in a manner indicated by the arrows in FIGURE 1. As tension is applied to the tape B, in a direction away from cable C, the inserts transmit force to lug 10. If these inserts were fixed in place, the surface 64 would exert a somewhat uniform froce against the surfaces 12, 14. Consequently, a higher stress, or force per lug cross-section, would be created at the inner end 22 of lug 10. Consequently, the lug must be sufficiently strong to withstand this high stress at the inner end. By providing the floating inserts 60, 62, the high reaction force at the inner end 22 of the lug 10 tends to rotate the inserts 60, 62 to transfer, or redistribute, forces to the upper end 24 of the lug. The upper end has a greater bulk and can absorb the higher forces. In other words, the floating inserts 60, 62 tend to redistribute the forces at the inner end of the lug to the larger outer end of the lug. This redistribution of the forces on the lug has proven to increase the load carrying capacity of a given sized lug. The surface 54 acts as a cam surface to guide the movement of the inserts 60, 62.

Referring now to FIGURE 4, a slight modification of the embodiment illustrated in FIGURES 1–3 is shown. In this embodiment, two woven tapes D, E are each provided with a lug 80. Each of these lugs is substantially identical and includes a vertical bearing surface 82 and an outer, concaved bearing surface 84. The surfaces 84 form the surfaces against which the inserts 60, 62 bear. Lubricant nipples 86 are provided in communication with the lubricant or anti-friction means 68, so that a sufficient amount of lubricant may be maintained between the surfaces 54, 66. The operation of the embodiment of the invention shown in FIGURE 4 is substantially identical to the operation of the preferred embodiment of the invention shown in FIGURES 1–3.

Referring now to FIGURE 5, a further embodiment of the invention is illustrated. In this embodiment, the anti-friction means 68' includes a plurality of roller elements, in the form of needle bearings 88. These needle bearings reduce the friction between the surfaces 54, 66. Another modification of the present invention is illustrated in FIGURE 6. In this embodiment, the anti-friction means 68" takes the form of a plain bearing. This plain bearing may be formed from a plastic, such as nylon or Teflon, or from an anti-friction metal, such as brass or babbitt. The operation of the embodiments of the invention illustrated in FIGURES 5 and 6 is substantially the same as the operation of the preferred embodiment illustrated in FIGURES 1–3.

Referring now to FIGURE 7, another embodiment of the present invention is illustrated. In this embodiment, the coupling F includes an inner lug receiving cavity 89 formed within a body 90. The cavity is provided with spaced lower shoulders 92, only one of which is shown. A floating insert 94 having an inner surface 96 adapted to contact bearing face 14 and outer angled surface 98 adapted to contact the shoulder 92, at point x, is provided between each shoulder 92 and the corresponding bearing face of lug 10. When tension is exerted on the tape B, the lug 10 is drawn downwardly and the inserts 94 are pivoted around pivot point x to transmit higher forces to the upper end of lug 10. These inserts 94 function substantially the same as the inserts 60, 62 of the previously described embodiments of the invention.

The present invention has been described with regard to various structural embodiments; however, various modifications in these embodiments, or substitution of the elements from one embodiment to the other, may be made without departing from the intended spirit and scope of the present invention as defined in the appended claims.

Having thus described my invention, I claim:

1. In a coupling for a flat woven band having a lug on the end thereof, said lug having two opposed bearing faces, said faces diverging from each other so that said lug has a smaller inner end and a larger outer end, said coupling including a body with means for connecting a support element thereon and there being a lug receiving cavity in said body, said cavity terminating in an opening through which said band extends, the improvement comprising: at least one floating insert in said cavity; said insert having a first surface generally matching one of said bearing faces and a second surface, and said cavity having a cam surface, said cam surface coacting with said second surface of said insert to force said first surface of said insert against said outer end of aid lug when tension is applied to said band.

2. The improvement as defined in claim 1 wherein said cam surface and said second surface are matching cylindrical surfaces with axes generally perpendicular to the transverse dimension of said band.

3. The improvement as defined in claim 2 including anti-friction means between said cylindrical surfaces.

4. The improvement as defined in claim 3 wherein said anti-friction means is a lubricant.

5. The improvement as defined in claim 3 wherein said anti-friction means is a bearing with spaced rolling elements.

6. The improvement as defined in claim 3 wherein said anti-friction means is a plain bearing.

7. The improvement as defined in claim 6 wherein said plain bearing is formed from a plastic material.

8. The improvement as defined in claim 1 wherein said bearing faces are tapered outwardly with respect to each other and are generally flat surfaces.

9. The improvement as defined in claim 1 wherein at least one of said bearing faces is a concaved surface.

10. The improvement as defined in claim 1 wherein said bearing faces are concaved surfaces.

11. The improvement as defined in claim 1 wherein said floating insert is pivoted by said cam surface away from said inner end and toward said outer end.

12. The improvement as defined in claim 11 wherein said insert is pivoted about a point adjacent said cam surface.

13. The improvement as defined in claim 11 wherein said insert is pivoted about a point spaced inwardly from said cam surface.

14. A coupling for a flat woven band having a lug on the end thereof, said lug having two opposed bearing faces, said faces diverging from each other so that said lug has a smaller inner end and a larger outer end, said coupling comprising: a body with means for connecting a support element thereon and a lug receiving cavity; said cavity being defined by a cylindrical surface with an axis generally parallel with the transverse dimension of said band; there being a slot generally parallel to said axis and through which said band extends when said lug is in said cavity; and two inserts in said cavity, each of said inserts having a first surface matching and contacting one of said bearing surfaces and a second cylindrical surface matching and contacting the cylindrical surface of said cavity.

15. A coupling as defined in claim 14 wherein said inserts are floating in said cavity.

References Cited

UNITED STATES PATENTS

| | | | |
|---|---|---|---|
| 727,759 | 5/1903 | Double et al. | 24—123.1 |
| 2,311,043 | 2/1943 | Furey | 24—123.1 |
| 3,264,017 | 8/1966 | La Garde | 24—123.2 XR |
| 3,263,289 | 8/1966 | La Garde | 24—265 |
| 1,539,962 | 6/1925 | Seufert et al. | 24—123.2 XR |

FOREIGN PATENTS

| | | |
|---|---|---|
| 1,101,062 | 3/1961 | Germany. |

DONALD A. GRIFFIN, *Primary Examiner.*